United States Patent [19]
Thieret et al.

[11] Patent Number: 5,471,313
[45] Date of Patent: Nov. 28, 1995

[54] METHOD AND CONTROL SYSTEM ARCHITECTURE FOR CONTROLLING TONE REPRODUCTION IN A PRINTING DEVICE

[75] Inventors: Tracy E. Thieret, Webster; Thomas A. Henderson, Rochester; Michael A. Butler, Penfield, all of N.Y.

[73] Assignee: Xerox Corporation, Stamford, Conn.

[21] Appl. No.: 21,438

[22] Filed: Feb. 24, 1993

[51] Int. Cl.⁶ .............................. H04N 1/00; H04N 1/32; G03G 21/00; G01D 15/14
[52] U.S. Cl. ..................... 358/296; 358/300; 358/401; 358/406; 358/468; 355/208; 347/133
[58] Field of Search ..................... 358/296, 298, 358/300, 401, 406, 468, 501, 504, 530; 347/133, 252, 253, 254; 355/202–208, 214, 246

[56] References Cited

U.S. PATENT DOCUMENTS

| | | | |
|---|---|---|---|
| 4,708,459 | 11/1987 | Cowan et al. | 355/4 |
| 4,986,526 | 1/1991 | Dastin | 271/227 |
| 5,087,940 | 2/1992 | Altmann | 355/204 |
| 5,189,441 | 2/1993 | Fukui et al. | 358/298 X |
| 5,194,878 | 3/1993 | Murakami et al. | 358/296 X |
| 5,221,973 | 6/1993 | Miller et al. | 358/468 |
| 5,231,452 | 7/1993 | Murayama et al. | 355/208 |
| 5,255,085 | 10/1993 | Spence | 358/406 X |
| 5,298,944 | 3/1994 | Sawayama et al. | 355/208 |
| 5,345,315 | 9/1994 | Shalit | 358/406 |

FOREIGN PATENT DOCUMENTS

| | | | |
|---|---|---|---|
| 0507589A2 | 7/1992 | European Pat. Off. | G03F 7/20 |
| 2127586 | 4/1984 | United Kingdom | G05B 15/02 |

*Primary Examiner*—Peter S. Wong
*Assistant Examiner*—Eric Frahm
*Attorney, Agent, or Firm*—Oliff & Berridge

[57] ABSTRACT

A controls system architecture for an image output terminal (IOT) has a hierarchical structure which isolates subsystem controls for purposes of efficient algorithm design, analysis and implementation. The architecture is preferably divided into three levels and has a controls supervisor which provides subsystem isolation functions and reliability assurance functions. The architecture improves image quality of IOT outputs by controlling the operation of the IOT to ensure that a toner reproduction curve of an output image matches a tone reproduction curve of an input image, despite several uncontrollable variables which change the tone reproduction curve of the output image.

35 Claims, 6 Drawing Sheets

METHOD AND CONTROL SYSTEM ARCHITECTURE FOR CONTROLLING TONE REPRODUCTION IN A PRINTING DEVICE

BACKGROUND OF THE INVENTION

1. Field of the Invention

The present invention relates to a hierarchical controls system architecture and method of controlling an image output by a marking engine of an image output terminal (IOT). The hierarchial architecture and associated method for controlling image output can be easily implemented in a wide variety of IOTs, especially in next generation marking engines.

2. Description of the Related Art

The controls system architecture for IOTs that output only black images (non-color IOTs) provide good IOT design using comparatively simple process control loops. While the methods and techniques developed for the marking engines of black only IOTs are successful, they cannot be used effectively with the marking engines of color IOTs. Color IOTs are required to produce high quality pictorial color images using several different primary colors. The process controls required for the color marking engines need to be significantly more complex as compared to the process controls for black only marking engines. Furthermore, as the popularity of color IOTs has increased rapidly, there is also greater customer demand for color quality and more stable and predictable output of the color IOT. Since precise control of multiple parameters is required to stabilize color IOTs, the available process data needs to be used effectively. The control of the color IOTs is complicated by the fact that multiple development subsystems are used in the color printing process rather than only one development subsystem used in black only IOTs. Moreover, if a tandem engine is used, control of four complete xerographic modules is required.

Thus, the traditional difficulties associated with the control of color IOTs along with the public demand for increased IOT image quality and reliability require a more complex controls system and a more comprehensive design for the controls system.

In digital laser printing and reproducing operations, a continuous tone image cannot be identically reproduced because of the limitations of the laser in the printer. The laser cannot identically match the continuous tone image because there are two sources which limit the ability of the IOT to write the continuous tone images on the photoreceptor. The first source of limitation is the difficulty in reliably determining which value of intensity of laser power should be used to partially expose the photoreceptor at a specific location at a given point in time. The photoreceptor inherently has non-uniformities which occur in space and time rendering this problem intractable. The second source of limitation is that the development process produces more stable image quality when the laser is operated to be either on or off and controlled such that a dot is either printed or not printed. To overcome these two limitations, a continuous tone image to be printed or reproduced must be interpreted such that the IOT mimics the continuous and gray tones of the image as accurately as possible. This is done by the known process of halftoning which involves filling in a certain percentage of each of the halftone cells to most accurately match the continuous tone image. The method used to reproduce a continuous tone image accurately is to match a tone reproduction curve of the continuous tone image as closely as possible. A tone reproduction curve is a series of assigned setpoints representing different half tone cell densities ranging from white (no coverage) to full solid area coverage. This curve can be assigned a certain number of levels of halftone cell densities. Each level or point on the TRC represents a different halftone cell density. When an IOT receives data from a continuous tone image to be printed or reproduced, these data correspond to a desired darkness at a location on the output print. The data are assigned to a location on the TRC corresponding to a density value near the desired darkness. So while the laser is writing individual dots in either black or white, the number and arrangement of these dots is chosen so that, at a distance, the appearance of tonal gradations is achieved. The greater the number of different tones or shades of gray that can be printed, the more closely the printer or copier can mimic the actual continuous tone image.

To achieve a high quality image, the tone reproduction curve of the image to be printed or copied must be maintained by the controls system of the IOT during the entire printing or copying process. A tone reproduction curve (TRC) of the image output by the printer or copier is affected by several variables, including changes in environmental factors such as humidity and temperature and uncontrolled changes in the xerographic elements, such as the photoreceptor, laser and developer material. All of these factors can cause the tone reproduction curve to vary, thereby altering the appearance of the output image. The control systems of the prior art have concentrated on correcting variances in the tone reproduction curve by separately controlling a few particular factors affecting the tone reproduction curve. The problem with controlling only a few factors separately is that the tone reproduction curve is affected by interactions involving a plurality of factors. Changing one factor to correct a variance in the tone reproduction curve may cause another factor to vary the tone reproduction curve and thus, the desired tone reproduction curve is not accurately maintained.

OBJECTS AND SUMMARY OF THE INVENTION

It is an object of the present invention to provide a hierarchical controls system architecture and method of controlling an IOT which yields increased IOT performance and reliability and can be applied to a large class of IOT designs.

It is also an object of the present invention to provide a system level architecture for a color IOT which yields increased performance and reliability while minimizing the design and maintenance complexity of the architecture.

It is another object of the present invention to provide a method for controlling the tone reproduction of printed or copied documents to provide a stable and predictable means for reproducing color pages.

It is also an object of the present invention to provide a system level hierarchical architecture which uses a system-wide view to provide process controls which result in increased image quality and IOT reliability.

It is another object of this invention to provide a system architecture which achieves the above objects while allowing modern decision making tools such as fuzzy logic, sensor fusion, neural networks, artificial intelligence, etc. to be easily incorporated into the architecture.

To solve the problems in the prior art associated with controlling one parameter affecting the tone reproduction curve, the method and hierarchical architecture of the present invention provide a controller that takes a system-wide view and simultaneously controls a plurality of factors affecting the TRC. If one factor is controlled to correct for a variance in the TRC, the remaining factors are monitored and adjusted if necessary to ensure that the TRC is accurately maintained at a predetermined tone reproduction curve.

As mentioned previously, a primary goal of the IOT control strategy of the architecture of the present invention is to maintain some specified tone reproduction curve. If the desired TRC is maintained, then the image output by the IOT will exhibit the desired color stability. To control the marking engine of a particular IOT to maintain a desired TRC, the hierarchical controls strategy of the architecture of the present invention is divided into three levels of controllers, Level 1, Level 2 and Level 3. The complexity of the architecture may be reduced by reducing the number of levels or the number of controllers at each level in order to reduce the cost of implementation but with a related reduction in accuracy of control of the desired TRC.

Each of the controllers in the three levels comprise a sensor, a controller algorithm and an actuator which adjusts the process being controlled by the controller in response to a sensed parameter. A controls supervisor is provided to monitor and control the behavior of each of the Level 1, 2 and 3 algorithms. The controls supervisor uses system-wide knowledge to make adjustments to those Level 1, 2 and 3 algorithms to increase reliability of the IOT and robustness of the controls system. The controls supervisor also performs a variety of other important functions detailed below.

The Level 1 controllers stabilize the individual process steps of forming an image locally by using data output from a single sensor provided for each Level 1 subsystem and directly adjusting an actuator for each of the Level 1 subsystems. Level 2 controllers provide regional rather than local control of intermediate process outputs. Level 2 controllers receive a set of scalar values from the Level 1 controllers in addition to sensor readings of the intermediate process output being controlled. Actuation in Level 2 occurs on an algorithm parameter of a Level 1 controller (usually a setpoint). That is, Level 2 actuates or adjusts based on a sensor output by changing at least one parameter for at least one Level 1 controller. Levels 1 and 2 adjust the physical components and processes involved in outputting an image in order to achieve TRC stabilization at a small number of discrete points. In between these points on the TRC, stabilization is achieved by the Level 3 controller which measures the output of the total system and adjusts the interpretation of the image at the input to the process.

The controls supervisor monitors the performance of the Level 1, 2 and 3 controllers and adjusts the individual and inter-related behavior of each of the Level 1, 2 and 3 controllers to respond to a number of varying conditions affecting print quality. At its lowest functional level, the controls supervisor arbitrates the recommended actuations from the Level 2 controllers and maintains setpoints for the Level 1 controllers within the limits dictated by latitudes determined during subsystem engineering. Design parameters are interpreted in the context of the current operating conditions. As changes in one subsystem can affect the remaining subsystems, the controls supervisor relies on information provided by each controller and other factors to accurately maintain the TRC. The controls supervisor further reads subsystem controller error logs to determine if there is valid data for each of the controllers and uses this information to resolve conflicts among the Level 1 subsystem controllers. The controls supervisor also performs a scheduling function by scheduling the actuations of the various Level 1, 2 and 3 controllers to ensure that a desired TRC is maintained. Also, the controls supervisor maintains a history of all of the actuations of Level 1, 2 and 3 controllers and adjusts the various controller algorithms to either enhance stability of the TRC if a setpoint is unchanged or increase the response time when adjustments to a setpoint are made. Since the controls supervisor has a system-wide view, it can monitor and adjust the operation of each subsystem affected by changing conditions and changes in other subsystems.

The controls supervisor can also perform numerous higher level functions. The controls supervisor can perform several reliability assurance functions including recognizing errors identified by individual controllers to flag an error for the IOT system software to inform the operator that a hardware failure has occurred. The controls supervisor also maintains a history of individual Level 1, 2, and 3 controller performance relative to the setpoints to develop an understanding of the evolution of the individual IOT subsystems and diagnose more subtle IOT failure modes. The controls supervisor also detects consistent failures of one or more process controls systems and in response, initiates more sophisticated diagnostic tools such as failure prediction and graceful recovery processes using modern decision making techniques such as fuzzy logic, neural nets, sensor fusion, genetic algorithms, etc. In addition, the controls supervisor can determine appropriate tradeoffs between the subsystems to maintain system output within specified limits and to prolong the life of the IOT subsystems.

The present invention is usable in a large class of IOTs such as color copiers, color printers and the like. The method and architecture of the present invention can be used in such a wide variety of IOTs because the architecture has a scalable and modular design which allows for application to IOTs of any technology and volume band. Scalability allows the performance of the IOT to be adjusted to a desired budget. Modularity allows the individual algorithms of the overall architecture to be adjusted to the desired subsystem set. The architecture may be defeatured to accommodate cost constraints (scalability), and elements of the architecture may be exchanged for others to accommodate varying subsystem technologies (modularity). By designing modularity and scalability into the architecture, a library of algorithms which conform to the interface requirements can be used in a plug and play fashion to respond to the changing needs of the product programs. That is, various software and hardware modules for the various subsystem controllers can be removed from the process controls of the marking engine of a particular IOT and new modules can be inserted.

To accomplish the goal of scalability and modularity, the elements or subsystems of the architecture are designed to be as independent from other subsystems as possible, accomplish a well defined function, have specific interfaces with the remainder of the architecture and allow for control of the algorithms by the controls supervisor.

BRIEF DESCRIPTION OF THE DRAWINGS

The invention will be described in detail with reference to the following drawings wherein.

DETAILED DESCRIPTION OF PREFERRED EMBODIMENTS

Figure 1:
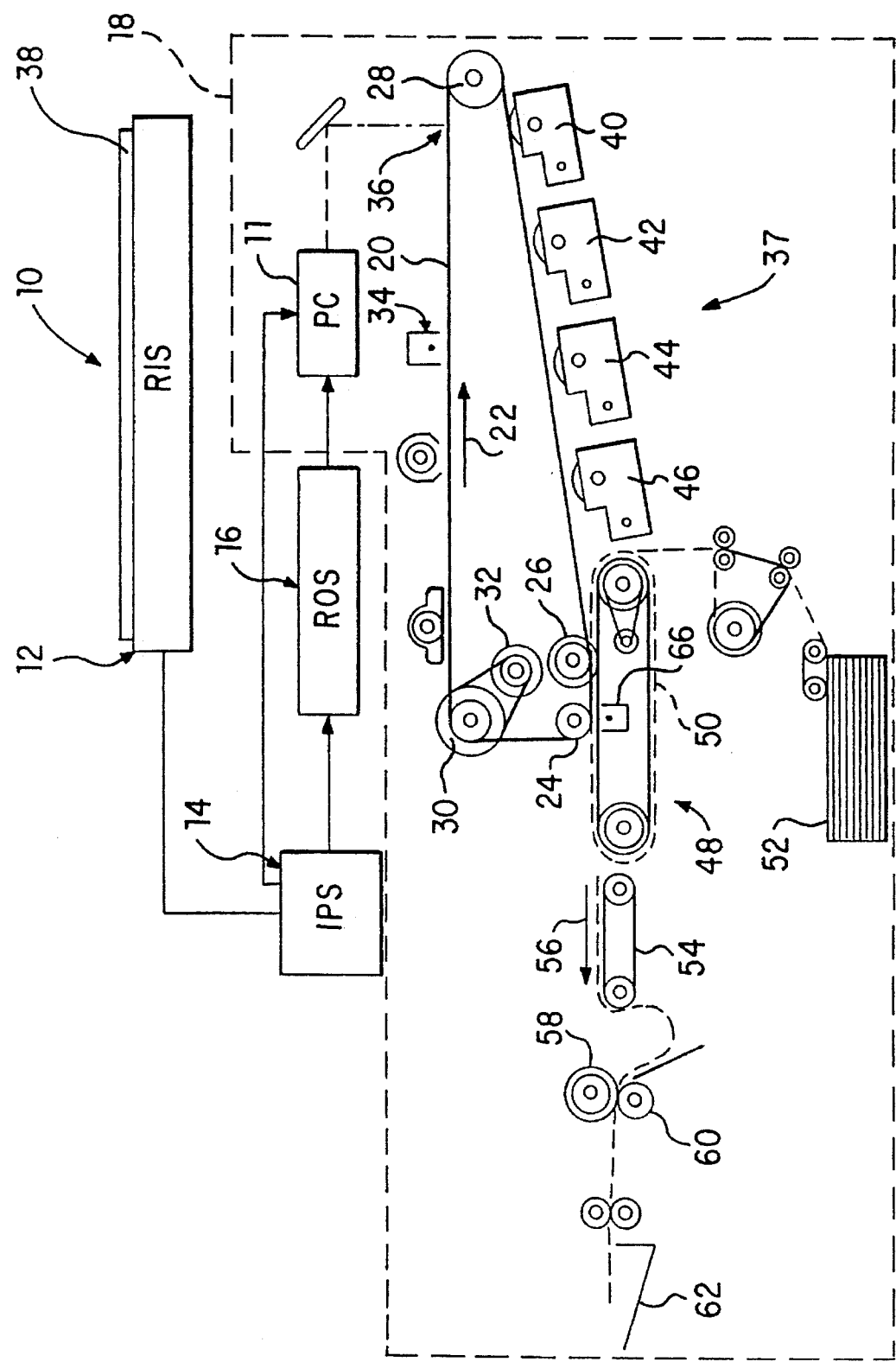
FIG. 1 is a schematic view showing a color reprographic marking engine and printing system having the controls architecture of the present invention.

The type of printer suitable for use with the controls system architecture of the present invention is described in U.S. Pat. No. 4,986,526, hereby incorporated by reference. A similar reprographic color printer 10 using the controls system architecture of the present invention is shown in FIG. 1. The controls system architecture can be implemented in a wide variety of IOTs and is not necessarily limited to the particular printing system shown in FIG. 1.

A reprographic printer uses a marking engine which typically is an electrophotographic printing machine. In an electrophotographic printer, a photoconductive member is charged to a substantially uniform potential to sensitize the surface thereof. The charged portion of the photoconductive member is selectively exposed which allows for dissipation of the charge in the irradiated areas thereon. This exposure records an electrostatic latent image on the photoconductive member corresponding to the informational areas contained within the document being reproduced. After the electrostatic latent image is recorded on the photoconductive member, the latent image is developed by bringing toner into contact therewith. This forms a developed toner image on the photoconductive member which is subsequently transferred to a copy sheet. The copy sheet is heated to permanently affix the toner image thereto in the desired image configuration.

In FIG. 1, during operation of the printing system, a multicolor original document 38 is positioned on a raster input scanner (RIS) 12. RIS 12 contains document illumination lamps, optics, and a mechanical scanning drive, and a charge coupled device (CCD array). RIS 12 captures the entire original document and converts it to a series of raster scan lines and measures a set of primary color densities, i.e., red, green and blue densities, at each of the original documents. This information is transmitted to an image processing system (IPS) 14. IPS 14 is the control electronics which prepare and manage the image data flow to the raster output scanner (ROS) 16. A signal corresponding to the desired image is transmitted from IPS 14 to ROS 16 which creates the output copy image. ROS 16 lays out the image in a series of horizontal scan lines with each line having a specific number of pixels per inch. ROS 16 includes a laser with a rotating polygon mirror block. ROS 16 exposes the charged photoconductive surface of printer 10 to achieve a set of subtractive primary latent images. The latent images are developed with cyan, magenta, yellow and black developer material, respectively. These developed images are transferred to a copy sheet and superimposed in registration with one another to form a multicolored image on the copy sheet. This multicolored image is then fused to the copy sheet forming a color copy.

With continued reference to FIG. 1, printer or marking engine 18 is an electrophotographic printing machine. The electrophotographic printing machine employs a photoreceptor or photoconductive belt 20. Belt 20 moves in the direction of arrow 22 to advance successive portions of the photoconductive surface sequentially through the various processing stations disposed about the path of movement. Belt 20 is entrained about transfer rollers 24 and 26, tension roller 28 and drive roller 30. Drive roller 30 is rotated by a motor 32 coupled thereto by suitable means such as a belt drive. As drive roller 30 rotates, belt 20 is advanced in the direction of arrow 22.

Initially, a portion of photoconductive belt 20 passes through a charging station 34. At charging station 34, corona generating devices or a scorotron charge photoconductive belt 20 to a relatively high substantially uniform potential.

Next, the charged photoconductive surface of belt 20 is moved to the exposure station 36. Exposure station 36 receives image information from RIS 12 having a multicolored original document 38 positioned thereon. RIS 12 captures the entire image from the original document 38 and converts it to a series of raster scan lines which are transmitted as electrical signals to IPS 14. The electrical signals from RIS 12 correspond to the red, green and blue densities at each point in the document. IPS 14 converts the set of red, green and blue density signals, i.e. the set of signals corresponding to the primary color densities of original document 38, to a set of colorimetric coordinates. IPS 14 then transmits signals corresponding to the desired image to ROS 16. ROS 16 includes a laser with rotating polygon mirror blocks. Preferably, a nine-facet polygon is used. ROS 16 emits a beam which illuminates the charged portion of photoconductive belt 20 at a rate of 400 pixels per inch. ROS 16 exposes the photoconductive belt to record four latent images. One latent image is adapted to the developer with cyan developer material. Another latent image is adapted to be developed with magenta developer material with the third latent image adapted to be developed with yellow developer material and the fourth with black material. The latent image is formed by ROS 16 on the photoconductive belt corresponding to the signals from IPS 14.

After the electrostatic latent image has been recorded on photoconductive belt 20, belt 20 advances the electrostatic image thereon to the development station 37. The development station includes four individual developer units 40, 42, 44 and 46 which develop the electrostatic latent images using toner particles of appropriate color as is conventional.

After development, the toner is moved to the transfer station 48 where the toner image is transferred to a sheet of support material 52, such as plain paper. At transfer station 48, the sheet transport apparatus comprising a sheet conveyor 50 moves the sheet into contact with photoconductive belt 20. At transfer station 48, a scorotron 66 sprays ions onto the backside of the sheet to charge the sheet to proper magnitude and polarity for attracting the toner image from photoconductive belt 20. In this way, the four color toner images are transferred to the sheet in superimposed registration with one another. After the sheet is fed around sheet conveyor 50 four times, the sheet is then released and fed to a sheet transport 54 in the direction of arrow 56 between fuser roll 58 and pressure roll 60 and then is deposited in a sheet receiving tray 62.

Figure 2:
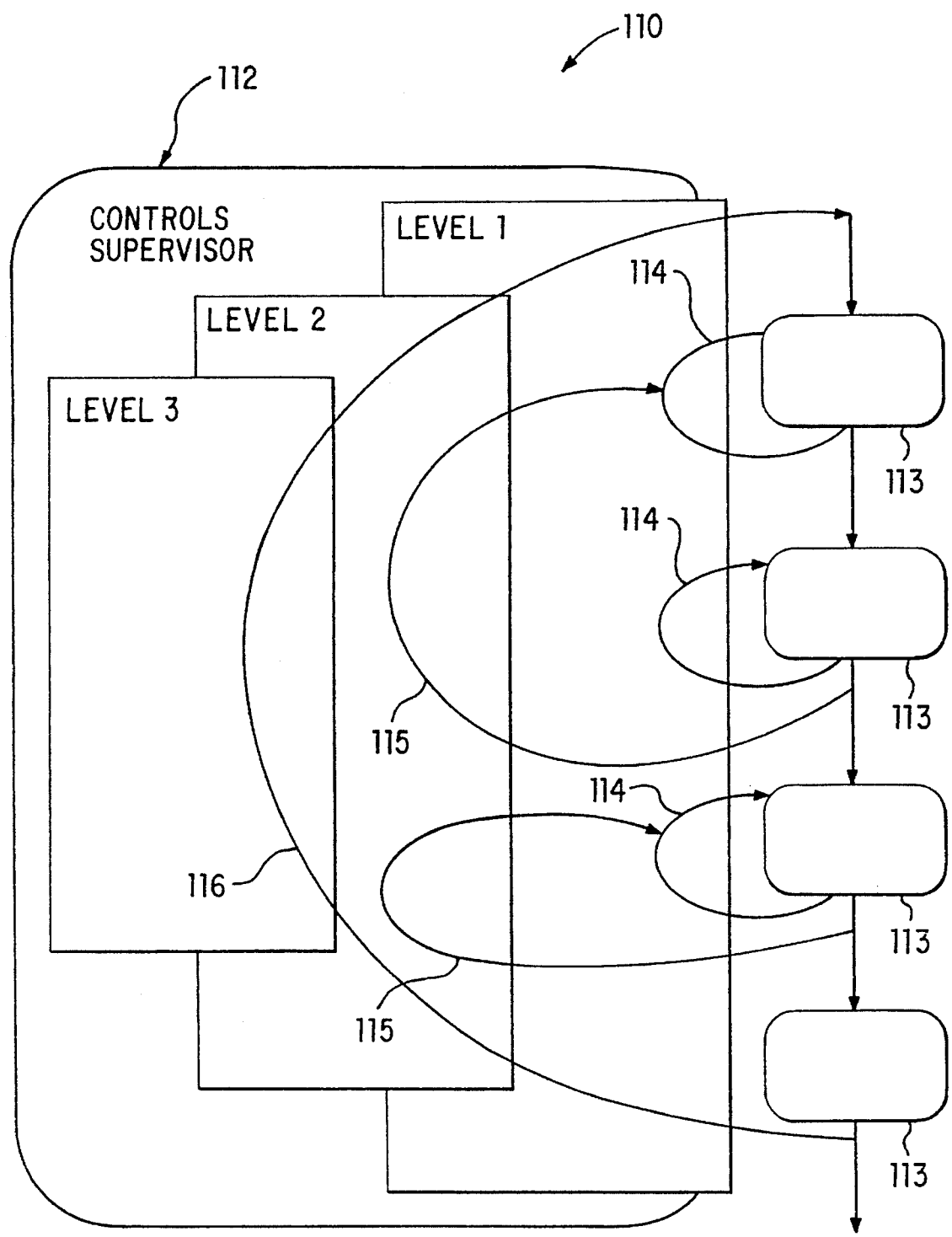
FIG. 2 is a schematic plan showing a hierarchical controls architecture of the present invention.

The hierarchical process controls architecture 110, shown generally in FIG. 2, can be implemented in a printer such as printer 10 shown in FIG. 1. The hierarchical process controls architecture 110 is implemented in the process controls 11 in marking engine 18 as shown in FIG. 1. Architecture 110 in process controls 11 communicates with IPS 14 and ROS 16 to control the quality of images output by printer 10.

A primary object of architecture 110 is to maintain a desired IOT image quality by maintaining a desired tone reproduction curve (TRC). An image input to be copied or printed has a specific TRC. The IOT outputting a desired image has an intrinsic TRC. If the IOT is allowed to operate uncontrolled, the TRC of the image output by IOT will distort the color rendition of the image. Thus, an IOT must be controlled to match its intrinsic TRC to the TRC of the input image.

An intrinsic TRC of an IOT may vary due to changes in such uncontrollable variables such as humidity or temperature and the age of the xerographic materials, i.e. the number of prints made since the developer, photoreceptor, etc. were new. As shown in FIG. 2, to accommodate and correct for the various changes, architecture 110 takes a system-wide view of the IOT marking engine and controls both the various physical subsystems 113 of the IOT and the interrelationships between subsystems 113.

As seen in FIG. 2, architecture 110 may be divided into three levels, Level 1, Level 2 and Level 3. Architecture 110 also has a controls supervisor 112 for controlling the interactions between the controllers of various levels. Level 1 includes controllers 114 for each of the subsystems 113. Level 2 includes at least two controllers 115 which cooperate with the Level 1 controllers 114. Level 3 includes at least one controller 116. Each of the controllers function and communicate with other controllers through specific interfaces provided in controls supervisor 112. Each controller has a sensor input, an actuation output and an algorithm having certain properties that can be controlled by controls supervisor 112. For each controller, a sensor reading is input to an algorithm which determines the particular actuation that will adjust the particular subsystem to ensure that a desired TRC is maintained.

Level 1 Controllers

Level 1 controllers 114 are required to maintain a scalar setpoint for each subsystem 113 to allow for short term stability of subsystems 113 which is required by Level 2 algorithms. Each subsystem 113 has a separate controller which directly controls the particular parameter or performance setpoint of that particular subsystem. Level 1 controllers 114 are sent information by various information sensors which sense the subsystem performance parameters locally as shown by the direct control loops depicting controllers 114 shown in FIG. 2. The sensed parameters are sent through a single process step or algorithm from which actuation control parameters are output to control various IOT subsystems 113.

Two separate algorithms may be provided for each Level 1 controller 114. One algorithm provides rapid response time when a Level 1 subsystem setpoint is changed to allow for quick stabilization required by Level 2 controllers 115. The second algorithm provides for noise immunity during a normal subsystem operation in which a setpoint is not changed.

Level 2 Controllers

Level 2 controllers 115 operate regionally, rather than operating locally as do Level 1 controllers 113. Level 2 controllers 115 control an intermediate process output. Input to the algorithms of Level 2 controllers 115 consist of a composite set of scalar quantities including temperature, humidity, developer age and any other factor affecting Level 2 controllers 115. Two examples of regional control configurations are shown in FIG. 2, but any appropriate configuration which operates regionally may be used.

Level 2 controllers 115 receive input data from either an information processing system in printer 10 or a scanner in a copier or a user interface. The input data informs Level 2 controllers 115 what the customer desires to be output. It is important to note that an image output desired by the customer may not always be exactly the same image that is input. That is, the customer may want to customize or change the appearance of the image.

The data input to Level 2 controllers 115 comprises multiple bits per pixel of a desired image to be output by an image output terminal. It is assumed that the input data are to be reproduced exactly as transmitted. That is, the colorimetric coordinates of the input image should match the measured colorimetric coordinates in the corresponding regions of the image output by the IOT. In order for the architecture of the present invention to accomplish this colorimetric coordinate matching function, the TRC intrinsic in a particular IOT must be determined. A TRC of a particular IOT is sensed by an optical sensor viewing test patches placed on the photoreceptor. Once an intrinsic TRC of a particular IOT is determined, the Level 2 controllers 115 control discrete points on the intrinsic TRC to match the TRC of the input image data. That is, the tone reproduction curve allows the IOT to output an image that corresponds to the image desired by the customer. Level 2 controllers 115 do this by sensing and deriving various discrete setpoints corresponding to the intrinsic IOT tone reproduction curve. Then Level 2 controllers 115 sense the performance of the setpoints of the tone reproduction curve with respect to corresponding setpoints on the desired TRC. Level 2 controllers 115 send Level 1 subsystem performance parameter recommendations to controls supervisor 112. As described later, controls supervisor 112 either accepts or adjusts these parameter recommendations and sends them to the Level 1 subsystem actuators to change the performance of Level 1 subsystems 113. By changing the Level 1 subsystems performances by a controlled amount, the Level 2 setpoints are maintained at their desired locations on the tone reproduction curve.

To sense and create the intrinsic TRC, Level 2 controllers 115 select the darkest or densest bit from the input data stream and assigns this density a value corresponding to the highest setpoint on a tone reproduction curve. Level 2 controllers 115 also select a certain density level, for example 50%, and assign this bit another density value corresponding to another setpoint on the tone reproduction curve. The lowest setpoint on the tone reproduction curve is always 0 and corresponds to background or white area on the image input. Level 2 controllers 115 set the white areas or 0 density areas of the input image and maintain this background area by maintaining a constant value of $V_{clean}$. Thus, Level 2 controllers 115 set up at least three points on the tone reproduction curve which are used to control the image output process.

Level 2 controllers 115 then sense the performance of the IOT corresponding to the few discrete points set up by Level 2 controllers 115 on the tone reproduction curve of the input image. That is, Level 2 controllers sense what density level is output and what density level is input and compares the two. If the setpoint of the intrinsic TRC moves or is different from the input density level, then the controllers 115 send a Level 1 parameter recommendation to correct for this difference. Level 2 controllers continuously check the output of the few discrete points to control these points on the tone reproduction curve.

Level 3 Controllers

While the Level 2 controllers control the solid area and halftone area or the upper and middle regions of the TRC, and $V_{clean}$ maintains the lower end of the TRC, other setpoints along the tone reproduction curve must be set up and controlled to produce an image with a desired color stability. These other regions are known as the highlight and shadow regions which experience variations in output density values just as the other areas do. The Level 3 controller 116 provides setpoints to control the output of the highlight and shadow regions and controls these setpoints to produce a high quality image output. Level 3 controller 116 senses the performance of the image output terminal corresponding to the highlight and shadow region setpoints and compares the performance data to the input data. Level 3 controller 116 then corrects for any difference between output performance data and input data by changing how RIS 12 interprets the input image.

PREFERRED EMBODIMENT

Figure 3:
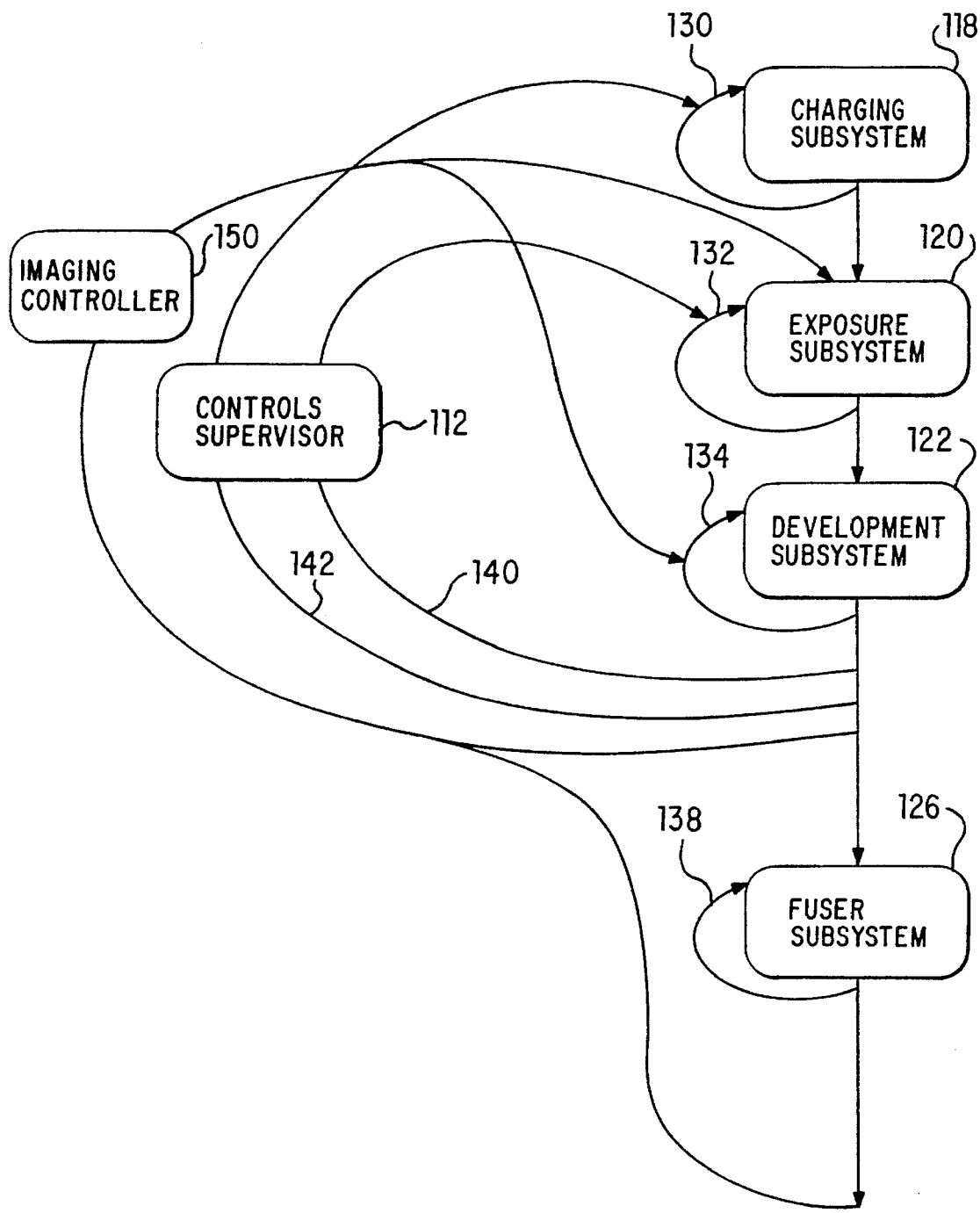
FIG. 3 is a schematic view of a preferred embodiment of the controls architecture of the present invention.

In a preferred embodiment depicted in FIG. 3, Level 1 subsystems to be controlled may include a charging subsystem 118, an exposure subsystem 120, a development subsystem 122, and a fuser subsystem 126. Further, any other physical subsystems of a printer or copier can be easily controlled and included in the architecture of the present invention. The Level 1 subsystems controllers may include any or all of the following controllers: a charging controller, an laser power controller, a toner concentration controller, a transfer efficiency controller, a fuser temperature controller, a cleaning controller, a de-curler controller and a fuser stripper controller. Other IOT controllers which control various physical subsystems of the IOT not mentioned here can be used in the present invention by simply designing the controllers such that they can be controlled by controls supervisor 112 as shown in FIG. 2 and can be inserted in a plug and play manner as described above.

Figure 4:
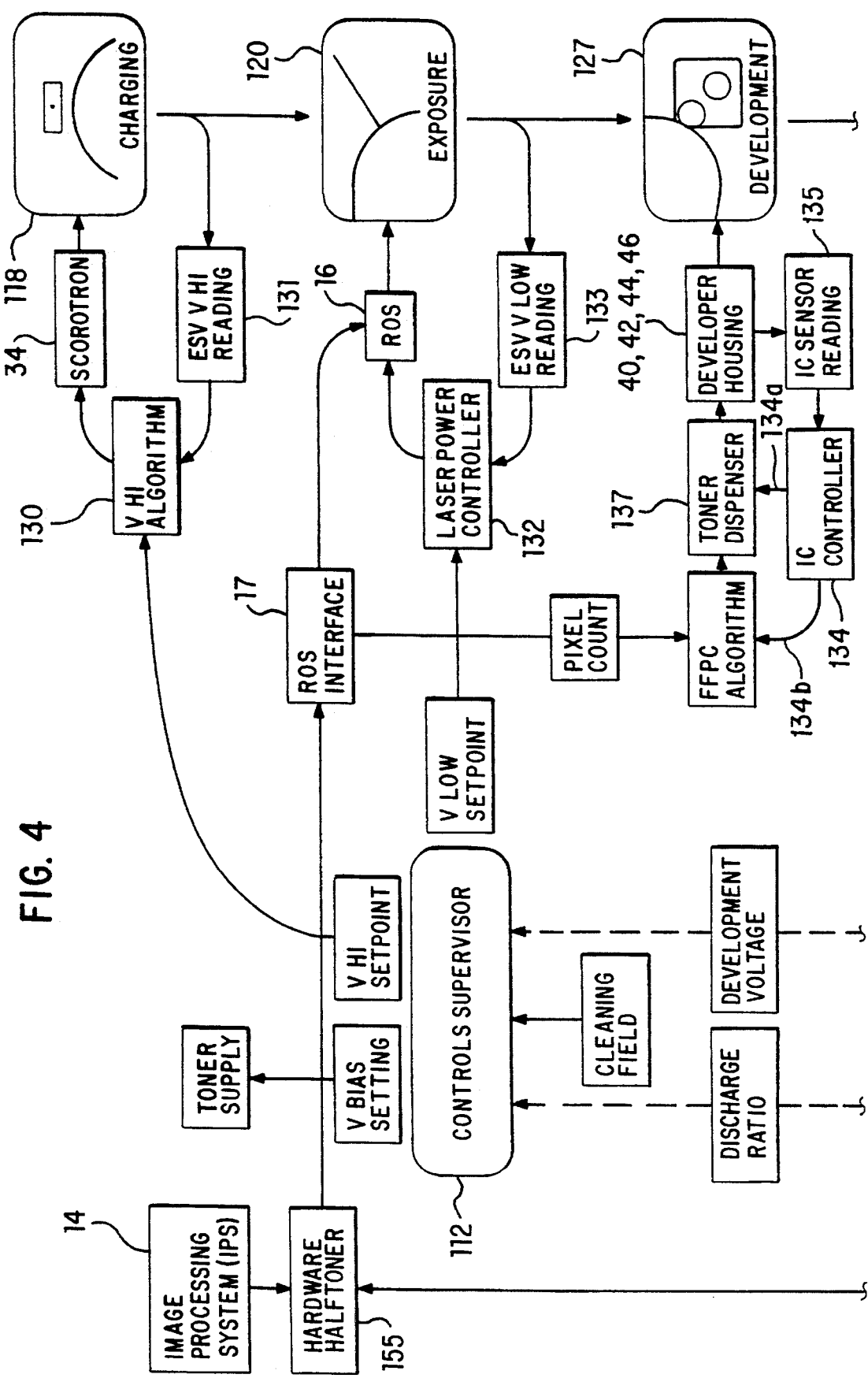
FIG. 4 is a schematic view of the interfaces between the three levels and controls supervisor of the preferred embodiment of the present invention.
Figure 4:
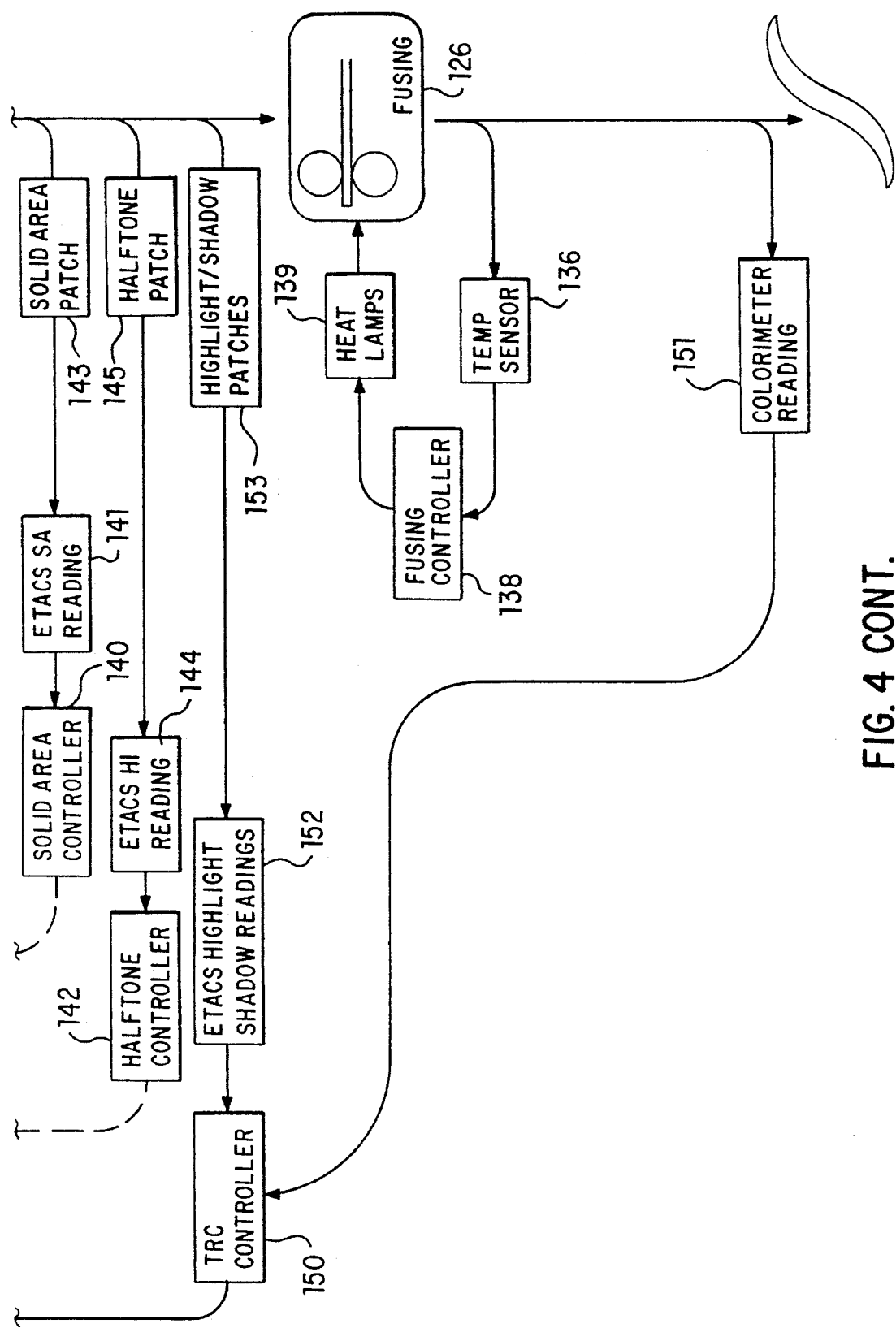

In a preferred embodiment of the invention shown in FIGS. 3 and 4, the Level 1 controllers include a charging controller 130, a laser power controller 132, a toner concentration controller 134, and a fuser temperature controller 138.

Charging controller 130 maintains a certain charge level on photoreceptor 20 by maintaining a certain setpoint corresponding to a desired TRC. It has been traditionally difficult to control charge on photoreceptors because of the various physical properties of the photoreceptors. The electrical properties of photoreceptors are governed by the physical properties and short and long term performance history. Rates of charge on the photoreceptor are well modeled and can be easily built into a controls system. However, real time feedback is required to correct variations in charge to maintain print quality through precision and stability.

In the normal charging process, charge is built up by scorotron 34 and is stored on photoreceptor 20. Charging controller 130 is a patch based controller which includes a sensor in the form of an electrostatic voltmeter 131 (ESV) to measure the charge stored on photoreceptor 20 at developer units 40, 42, 44 and 46 before exposure. ESV 131 takes electrostatic readings of photoreceptor voltage on interdocument zone (IDZ) patches or patches located between two successive documents. However, ESV 131 cannot measure the voltages at these locations because of the presence of the housings of the developer units 40, 42, 44 and 46. Interpolations and projections of the voltages at the housing locations along photoconductor 20 must be made from sensor readings made away from the housing locations. The sensed values for the charge at the housing locations on photoreceptor 20, referred to as $V_{hi}$, measured by ESV 131 are input to a charging controller algorithm which actuates using a scorotron grid potential charge. That is, if the detected $V_{hi}$ in a certain housing area is too low, the algorithm in controller 130 adjusts $V_{hi}$ by raising or lowering the charge on the scorotron thereby raising or lowering charge on the photoreceptor respectively. By maintaining a predetermined setpoint for $V_{hi}$, the desired TRC can be maintained.

Laser power controller 132 controls the amount of laser power used to expose or discharge photoreceptor 20. Laser power controller 132 uses an electrostatic voltmeter 133 to sense the discharge potential in an IDZ patch of photoreceptor 20 after exposure. That is, ESV 133 detects the voltage level, $V_{low}$, on photoreceptor 20 after being exposed. Laser power controller 132 seeks to control a discharge ratio DR, by the relationship $DR = (V_{low}-V_{res})/(V_{hi}-V_{res})$, where $V_{res}$ is equal to a baseline voltage measured by exercising laser power exposure until the exposed voltage does not discharge further with increasing exposure power. The discharge ratio indicates how the development potential $V_{dev}$ and cleaning field $V_{clean}$ are positioned on the PIDC (Photo Induced Discharge Curve), where $V_{clean}$ is a cleaning field equal to the difference between a housing bias voltage and the voltage of areas discharged by exposure. As the level of charge left on the photoreceptor after exposure varies, varying amplitudes of laser power are needed to achieve the appropriate discharge level. If the charge left on the photoreceptor is too low, the laser power output is decreased and if the charge is too high, then laser power output is increased.

Laser power controller 132 includes a setup routine and a run-time algorithm. The setup procedure determines the relationship between the initial charge on the photoreceptor $V_{hi}$ and exposed voltage $V_{ex}$ as a function of laser power setting and stores these relationships as curves on a graph. These curves permit an initial estimate of the required laser power. Laser power controller 132 is a feedback controller that takes charge level $V_{hi}$ and discharge ratio DR as arguments, calculates an appropriate discharge level from setup data, measures the exposed voltage $V_{low}$ on photoreceptor 20 and adjusts laser power to convert for changing photoreceptor properties.

Toner concentration controller 134 uses both a feedback control loop 134a and a feedforward control loop 134b to adjust the amount of toner concentration in the housings of developer units 40, 42, 44 and 46 to maintain a setpoint toner concentration value corresponding to a desired TRC. The amount of charge in the developer housing is a function of the weight percentage ratio of carrier to toner. Feedback control loop 134a of toner concentration controller 134 has a magnetic conductive sensor 135 which senses the packing fraction of carrier to toner in the toner housing and thus, senses the toner concentration. The sensed parameter amount of toner is input to toner concentration controller 134 and the controller actuates a toner dispenser 137, in the form of an auger, in a toner supply housing to rotate a certain number of times to add the correct amount of toner to the housings of the developer units 40, 42, 44 and 46 to achieve a desired toner concentration setpoint.

Feedforward control loop 134b of toner concentration controller 134 uses pixels to predict an upcoming increase in the demand for toner particles to pre-dispense the necessary amount of toner particles in the developer housings. Feedforward control loop 134b is needed because of the inherent delay when sending a signal requesting more toner and when the auger in the toner supply actually delivers the toner to the developer units. The pixel counting is typically done by ROS 16 which receives image data from IPS 14 via a hardware halftoner 155 and a ROS interface 17. ROS 16 usually has a series of dividers present whose output toggles when a set number of pixels are written to photoreceptor 20. Toner concentration controller 134 monitors these transitions and the amount of toner in queue. Toner concentration controller 134 dispenses an amount of toner to the developer housings in accordance with a linear relationship between the counted pixels and toner consumption.

The resulting operation of feedback 134a and feedforward 134b algorithms of toner concentration controller 134 is additive, that is, the algorithms work together. For example, if the pixel data sent to feedforward algorithm 134b is inaccurate for some reason, i.e. the toner is supposed to be increasing but is not, feedback algorithm 134a detects this by detecting the amount of toner and corrects for this error by actuating the auger to dispense more toner.

Fuser temperature controller 138 controls the fuser temperature using an internal controller. A temperature sensor 136 senses the heating roll temperature and uses a fuser controller algorithm having heat flow equations to adjust the duty cycle of heating lamps 139 to maintain setpoint temperature.

The Level 1 controllers directly regulate the physical subsystems of the IOT to ensure stability required by Level 2 controllers. The preferred embodiment shown in FIGS. 3 and 4 includes a solid area controller 140 and a halftone controller 142 which control development of a solid area and a halftone area, respectively, on the tone reproduction curve. The background area can be controlled by maintaining a constant value for $V_{clean}$ or controlled as explained later.

As described previously, a solid area setpoint and a halftone setpoint are selected from the input pixel data and are set as setpoints on the IOT tone reproduction curve. Solid area controller 140 and halftone area controller 142 then monitor the performance of these setpoints to ensure that they remain at the desired location on the TRC corresponding to the TRC of the input image. The accuracy of performance of each of the solid area setpoint and halftone area setpoint of the tone reproduction curve corresponding to the output image is affected by uncontrolled variations in temperature and humidity as well as developer age, amount of charge on photoreceptor 20 and laser power. However, these variables affect the different areas in different ways. Since Level 1 controllers 113 stabilize the various physical subsystems of Level 1, electrostatic variations, exposed voltage, cleaning field and toner concentration are maintained at desired setpoints by Level 1 algorithms. Also, the variations in the Level 2 controlled parameters occur more slowly than changes in Level 1 subsystems. Variations in Level 2 are compensated for by changing the setpoints of the Level 1 controller algorithms. That is, Level 2 controllers 115 sense information regarding the variations in the Level 2 controlled parameters and outputs parameter recommendations through controls supervisor 112 to the control algorithms of the Level 1 controllers rather than directly controlling the process of the Level 1 subsystems.

Figure 5:
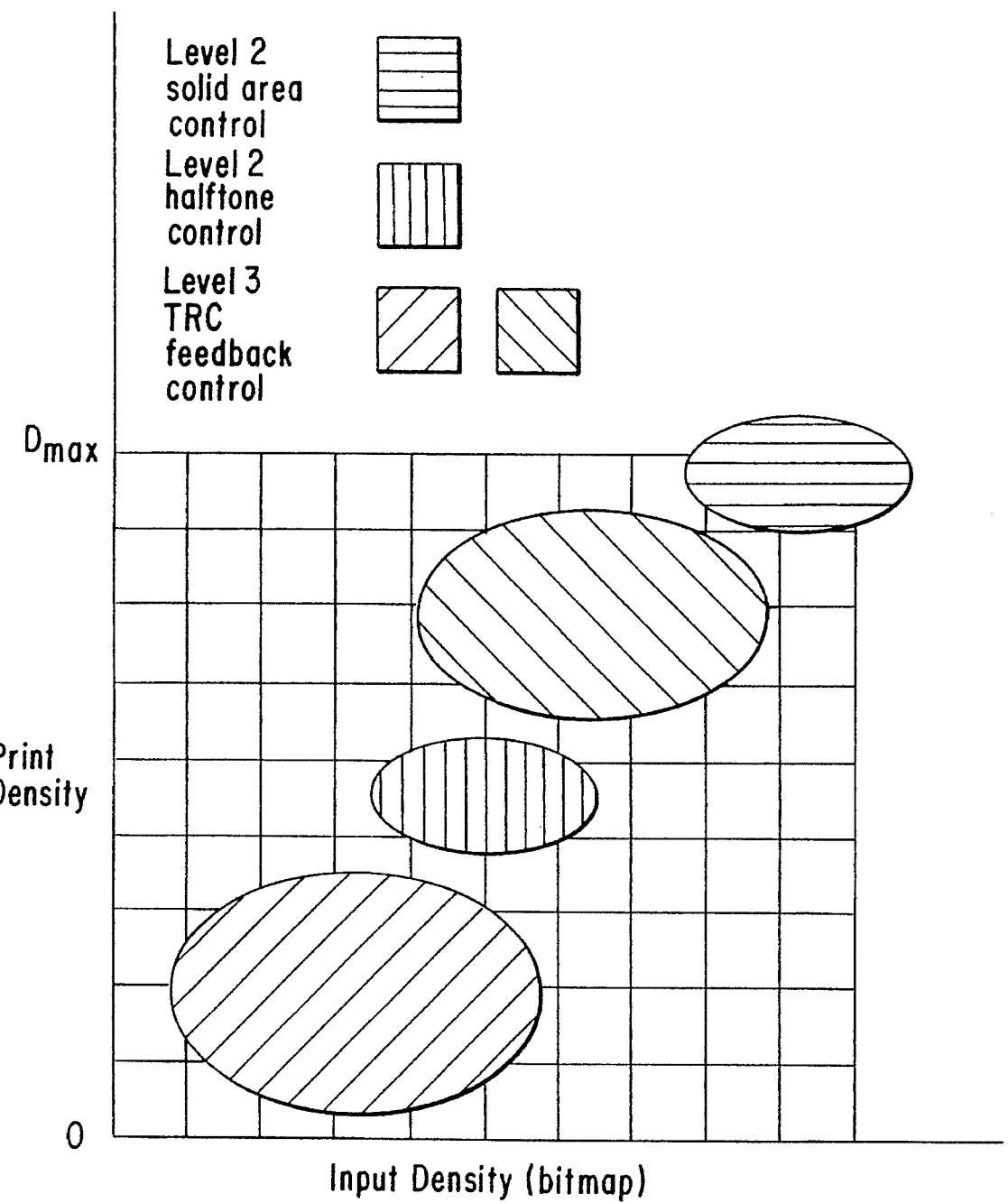
FIG. 5 is a graph of a tone reproduction curve showing the areas of control of Levels 2 and 3 of the present invention.

While the Level 1 controllers have data output by sensors in the form of one scalar quantity, Level 2 data consists of a group of composite scalars which define a number of different conditions not directly related to each other. The primary object of Level 2 controllers 115 is to ensure that the Level 2 setpoints are maintained at their desired points on the TRC. The solid area setpoint is set to be at the 100% density level or highest gray tone value on the TRC and is used to control the upper end $D_{MAX}$ of the TRC as seen in FIG. 5. The halftone setpoint is chosen to be at some point between $D_{MAX}$ and O (background area). The halftone setpoint of the preferred embodiment has been selected to be at 50% density. Alternatively, a highlight halftone controller can be provided with a setpoint set at another value, i.e. 10% density, to control the TRC at the lower end of the TRC, close to O. The background area can be controlled by controlling $V_{clean}$.

Solid area controller 140 controls the location of the solid area setpoint in the high density region near $D_{MAX}$ as shown in FIG. 5. Solid area controller 140 is a patch based controller which uses an optical sensor 141 to detect diffuse reflectance of toner on photoreceptor 20. The patch based controller looks at a one inch square patch area 143 on the photoreceptor in the IDZ between customer documents to determine a solid area patch density and maintain a predetermined patch density corresponding to the setpoint location on the TRC. If optical sensor 141 is properly calibrated, a developed mass/area (DMA) can be determined. This DMA is an intermediate output of the system and thus, variations in readings can be traced to several sources.

The objective of solid area controller 140 is to maintain DMA at constant value to maintain the position of the solid area setpoint on the tone reproduction curve. Also, by controlling DMA at a certain value, the pile height of the toner particles is controlled. If solid area controller 140 detects that the developed mass/area is not being maintained at a proper value, solid area controller 140 senses this difference in value and outputs a recommended Level 1 subsystem performance parameter to controls supervisor 112.

When a change in DMA value is sensed, solid area controller 140 determines an appropriate change in the development field ($V_{dev}=V_{low}-V_{bias}$) and sends this recommendation parameter for the development voltage to controls supervisor 112. Controls supervisor sends this recommended parameter or an adjusted parameter to the $V_{hi}$ algorithm in charging controller 118. Charging controller 118 then sends a signal to its actuator, scorotron 34, and adjusts the charge amount on photoreceptor 20 to achieve the new parameter sent by controls supervisor 118. The adjusted charge amount on photoreceptor 20 therefore controls the pile height on photoreceptor 20. When the new development voltage parameter is reached by charging subsystem 118, the DMA value will be returned to the desired value and the solid area setpoint will be maintained at its proper location on the tone reproduction curve.

It should be pointed out that a change in DMA value can also be accommodated by sending new Level 1 subsystem parameter recommendations for other Level 1 subsystems.

Halftone controller 142 controls a point located between the background area (0 density on the TRC as shown in FIG. 5) and the solid area limits of the TRC. The particular placement of this point along the TRC can be selected according to implementation requirements. In the preferred embodiment, the 50% density level was determined to produce maximum sensitivity to actuator changes.

Halftone controller 142 controls variations in the midtone regions of the TRC as seen in FIG. 5. Halftone controller 142 works in much the same way as solid area controller 140 does. The quantity to be controlled by halftone controller 142 is the discharge ratio which depends on $V_{low}$, $V_{hi}$ and $V_{res}$. As the halftone development is a function of both toner pile height and dot gain, it is useful to activate halftone controller 142 only after solid area controller 140 has converged to its setpoint so as to stabilize pile height. This scheduling function can be carried out by controls supervisor 112 as described later. Similar to solid area controller 140, halftone controller 142 uses properly calibrated photosensors 144 to sense the mass of toner developed in the halftone area by looking at a one inch square halftone patch area 145. When a variation from a predetermined halftone DMA is sensed, halftone controller 142 determines the correct value for DR and sends this recommended value to controls supervisor 112 which determines how $V_{hi}$, $V_{low}$ and $V_{bias}$ (power supply) should be changed to obtain the correct value for DR. These new values for $V_{hi}$, $V_{low}$ and $V_{bias}$ are new parameters sent to Level 1 controllers by controls supervisor 112. When these new parameters are achieved by Level 1 controllers 114, the halftone DMA is returned to the desired value and the halftone area setpoint is returned to its desired position on the tone reproduction curve.

The background region of the tone reproduction curve, located at the O end of the TRC in FIG. 5 can be maintained by maintaining a certain value for $V_{clean}$. In normal operation, $V_{clean}$ is set to a constant value. That is, the setpoint value for $V_{clean}$ is set to the particular level of voltage that produces a field on the photoreceptor which causes toner to move away from the paper such that no toner is applied to the paper. Thus, $V_{clean}$ must be chosen such that toner is biased toward the developer units and not toward the paper. Alternatively, $V_{clean}$ can be controlled by controlling either charging controller 130 or laser power controller 132.

Thus, Level 2 controllers 115 set up three setpoints on a desired tone reproduction curve and control the location of these setpoints to ensure the output image is that requested by the customer in the form of the input data.

While Level 2 controllers 115 set up and control three points on a desired TRC, the remaining points on the TRC must be set and controlled to ensure that the desired TRC is produced in the output image. Thus, a Level 3 imaging controller 150 is provided to take colorimetric measurements of an output image and use these values to calibrate the actual TRC of the IOT to the desired TRC determined from the input data. Once all of the setpoints of the TRC are determined, controller 150 can control these Level 3 setpoints to ensure all points on the TRC of the output image mimic the corresponding points on the TRC of the input image.

The calibration can occur by using a patch based controller having a colorimeter 151 and a sensor which measures patches of different densities. The colorimeter 151 is located in the output tray and measures the densities actually output to the output image. Imaging controller 150 compares a density level input by the customer to the density level detected by colorimeter 151. Imaging controller 150 does this comparison for each density patch and assigns a setpoint on the tone reproduction curve for each density patch. If imaging controller 150 detects a difference in the desired density value and the output density value, this difference is sent to a hardware halftoner 155 which has a look-up table for converting continuous tone image data input to halftone output data. If the output image varies from the desired TRC, the imaging controller 150 changes how an image to be copied is interpreted by the IOT so that the desired TRC is maintained. Imaging controller 150 senses the error and applies an inverse of the error to correct the error. For example, if a desired input density dot value is 39% but the dot value of the image actually output is 37%, an error of −2% results. Imaging controller 150 changes the way a 39% dot is interpreted by RIS by adding 2% so that the actual output density will be 39%. Thus, imaging controller 150 applies an inverse error correction of +2 to the data supplied to ROS 16 via ROS interface 17. Imaging controller 150 performs this adjustment for every point on the TRC. By altering the interpretation of the image in real time, control of the tone reproduction curve is possible.

An alternative to using a colorimeter is to use a surrogate measuring device. If the optical sensors 152 such as those used in Level 2 controllers are properly calibrated, the optical measurements of the highlight and shadow patches 153 on photoreceptor 20 can be used as substitutes for paper colorimetry. Gray balance, the ability to print process gray patches (mixing the three primary colors) is an important starting point for controlling the color quality of the process. Calibration of the imaging controller 150 focuses on this. The equivalent neutral density (END) of each tonal separation is determined for each process gray level. END for a separation measures the amount of halftone density of each separation which results in a neutral gray when they are mixed. These measurements are performed on paper and when gray is achieved the photoreceptor optical measurement is recorded. When a number of gray densities are achieved, what results is a curve for each separation which describes the optical sensor response required to obtain gray balance. These three curves (one each for Cyan, Magenta, and Yellow) are stored as the setpoints for the imaging controller 150.

Thus, imaging controller 150 uses the setpoints determined as described above and when changes due to materials and environmental factors create errors in the actual TRC of the output image, the interpretation of the image to be copied is altered to achieve the desired TRC. This altering of interpretation occurs in real time by altering a look up table in a hardware halftoner which converts the control image data to halftone data.

Controls Supervisor

Controls supervisor 112 performs several functions including lower level and higher level functions. Lower level functions performed by controls supervisor 112 include arbitrating the recommended actuation from Level 2 controllers and maintains Level 1 setpoints within the latitude limits determined during subsystem engineering. Since there may be several collections of Level 1 setpoints which will meet the Level 2 requirements for control, it is necessary to determine which of these groups of setpoints is appropriate at any given time. The controls supervisor enables intelligent actuations in a system for which the parameters are not unique. As changes in one subsystem can affect the output of other subsystems, the controls supervisor balances these changes to achieve accurate maintenance of the TRC. Controls supervisor 112 further reads subsystem controller error logs to determine if there is valid data for each of the controllers and uses this information to resolve conflicts among the Level 1 subsystem controllers. Controls supervisor 112 also performs a scheduling function by scheduling the actuations of the various Level 1, 2 and 3 controllers to ensure a desired TRC is maintained. As mentioned previously, the actuation from solid area controller 140 should occur first to allow pile height to stabilize and then the actuation from halftone area controllers 142 can occur next. Controls supervisor 112 realizes the need for solid area controller actuations to occur first and schedules the actuations accordingly.

Also, controls supervisor 112 maintains a history of all of the actuations of Level 1, 2 and 3 controllers and adjusts the various controller algorithms to either enhance stability of the TRC if a setpoint is unchanged or increase the response time when adjustments to a setpoint are made. As mentioned previously, the Level 1 controllers can have two separate control algorithms; one for enhancing stability and reducing noise and the other for providing rapid response when adjustments are made. Controls supervisor 112 recognizes when a Level 1 subsystem parameter is changed and therefore, knows to interface with those Level 1 algorithms that provide for rapid response. If no subsystem parameter is changed, then controls supervisor 112 knows to interface with the Level 1 algorithms that provide for increased stability and low noise. Since controls supervisor 112 has a system-wide view, it can monitor and adjust the operation of each subsystem affected by changing conditions and changes in other subsystems.

Controls supervisor 112 can also perform numerous higher level functions. Controls supervisor 112 can perform several reliability assurance functions including recognizing errors identified by individual controllers to flag an error for the IOT system software to inform the operator that a hardware failure has occurred. Controls supervisor 112 also maintains a history of individual Level 1, 2, and 3 controller performance relative to the setpoints to develop an understanding of the evolution of the individual IOT subsystems and diagnose more subtle IOT failure modes. Controls supervisor 112 also detects consistent failures of one or more process controls systems and, in response, initiates more sophisticated diagnostic tools such as failure prediction and graceful recovery processes using modern decision making techniques such as fuzzy logic, numeral nets, sensor fusion, genetic algorithms, etc. In addition, controls supervisor 112 can determine appropriate tradeoffs between the subsystems to maintain system output within specified limits and to prolong the life of the IOT subsystems.

OPERATION OF PREFERRED EMBODIMENT

When an image to be copied is placed on printer 10, RIS 12 scans the image as described above. The electrical signals output from RIS 12 correspond to dot densities for each point or pixel in the document. Level 2 controllers 115 access the input image data output from RIS 12 and set a solid area setpoint and a halftone setpoint. Then solid area controller 140 and halftone area controller 142 control the performance of these setpoints by sending actuation signals or Level 1 subsystem parameter recommendations to controls supervisor 112 as described previously. Imaging controller 150 in Level 3 fills in the remaining setpoints between the Level 2 setpoints to complete the tone reproduction curve of the IOT. Then, imaging controller 150 controls the performance of these setpoints as described previously.

Controls supervisor 112 converts the Level 2 parameter recommendations into Level 1 subsystem setpoints. That is, controls supervisor 112 determines what series of actions by marking engine 118 will allow the TRC setpoints to be met and outputs the determination in the form of Level 1 subsystem setpoints. Although controls supervisor 112 can determine what actions are required to achieve the desired TRC setpoints, controls supervisor 112 does not have the ability to control marking engine 18 to achieve these setpoints. Therefore, the Level 1 subsystem setpoints are used by Level 1 subsystem controllers to control the various subsystems in printer 110 to ensure that the desired TRC is maintained.

The Level 1 subsystem controllers send various actuation control signals to marking engine 18 through ROS 16 to attain the particular subsystem setpoints recommended by controls supervisor 112, thereby ensuring that the desired TRC is maintained.

As uncontrollable variables such as humidity and temperature can change unpredictably, controls supervisor 112 continuously checks to ensure that the predetermined TRC setpoints are maintained and the desired TRC is accurately produced in the output image. Controls supervisor 112 also continuously performs a checking function which insures that the Level 2 recommended parameters for the Level 1 subsystem controllers are operating within safe limits.

The Level 3 imaging controller 150 cooperates with the Level 2 controllers to maintain the shape of the tone reproduction curve in the regions not governed by the Level 2 algorithms. To accomplish this fine tuning operation, color measurements are taken (either in real-time or in a calibration mode) from paper prints/copies in order to ascertain the output performance of the IOT. If the data are taken in calibration mode, determination of the relationship between an intermediate process output and the output print/copy is made and stored as setpoint curves. When deviations from the desired TRC are detected, alterations are made in the way the system handles the input video data stream coming from the source of the customer image data. These alterations adjust the elements of a vector or matrix used to tailor the image data to the IOT.

Controls supervisor 112 performs several reliability assurance functions including recognizing errors in the individual subsystem controllers. Level 1 subsystem controllers are responsible for recognizing gross sensor failures. Controls supervisor 112 detects the gross error of a particular subsystem and flags an error in the IOT system software to inform the operator that a hardware failure has occurred. In the case of an insurmountable or gross error, controls supervisor 112 can either signal the user or call service directly to fix the printer before actual failure occurs.

The xerographic printers operate according to a so called "state of the xerography" reasoning function. This function explains how the Level 1 setpoints can interact so that a desired output can be obtained by many different values of the setpoints. The goal of architecture 110 is to move the setpoints in such a way that the best performance for the longest period of time is achieved. To do this, controls supervisor 112 controls each of the Level 1 controllers including charging controller 130, laser power controller 132, toner concentration controller 134, and fuser temperature controller 138 simultaneously to ensure that each of the specified setpoints are maintained to maintain the desired TRC.

Controls supervisor 112 also ensures a desired TRC by maintaining a history of each individual subsystem controller performance relative to the setpoints. The history of performance of the subsystem controllers is used to develop an understanding of evolution of the individual IOT subsystems as well as diagnose more subtle IOT failure modes. Furthermore, controls supervisor 112 switches to the use of more sophisticated diagnostic tools to check the data bases that have been recorded when controls supervisor 112 detects consistent failures in one or more of the process control systems.

A xerographic printing device typically shows a history of behavior starting from the time of last service, or from the time of manufacture, to the present. Materials such as the photoreceptor and developer in a xerographic device have limited lifetimes. As the properties of these materials change over time, both Level 1 and Level 2 controllers will show an evolution in setpoint values. By maintaining a history of setpoint and actuation values, controls supervisor 112 can track the course of aging of the xerographic subsystems. With knowledge of past evolution, a prediction of future behavior can be made. With such a prediction, pre-emptive actions can be made, such as notifying the customer of impending failure, and corrections by customer or service representative can be performed to reduce down time and increase reliability.

Thus, controls supervisor 112 separates the individual subsystems and allows a system level management to ensure a predetermined TRC. This simplified architecture allows for modern decision tools such as fuzzy logic, neural networks, artificial intelligence, etc. to be incorporated easily into the architecture. The simple and efficient design of the architecture also allows for incorporation into a wide variety of xerographic marking engines.

The invention has been described with reference to the preferred embodiments thereof which are illustrative and non-limiting. Various changes may be made without departing from the spirit and scope of the invention as defined in the appended claims.

What is claimed is:

1. A control assembly for controlling tone reproduction in a system having a plurality of printing subsystems, the printing subsystems cooperating to form and output image on a substrate, the control assembly comprising:

means for inputting image data representative of an input image;

a first plurality of control means, each of the first plurality of control means controlling a corresponding one of the plurality of printing subsystems, each of said first plurality of control means comprising:

sensing means for sensing and outputting subsystem performance data of the corresponding printing subsystem, and controller means for generating and outputting a subsystem performance control signal to the corresponding printing subsystem based on a current subsystem performance parameter and the sensed subsystem performance data output by the corresponding sensing means, the corresponding printing subsystem controlled to minimize a difference between the sensed subsystem performance data and the current subsystem performance parameter;

a second plurality of control means, each of the second plurality of control means controlling and adjusting an intermediate process output, each of said second plurality of control means comprising:

sensing means for sensing intermediate process output data, generating means for generating at least one recommended subsystem performance parameter for at least one corresponding control means of the first plurality of control means based on the intermediate process output data and at least one intermediate system performance setpoint, and output means for outputting at least one of said at least one recommended subsystem performance parameters; and a controls supervisor communicating with said first plurality of control means and said second plurality of control means and inputting the at least one recommended subsystem performance parameter output from said second plurality of control means, said controls supervisor comprising:

revising means for revising at least one subsystem performance parameter based on the at least one recommended subsystem performance parameter output by the second plurality of control means and at least one current subsystem performance parameter of the first plurality of control means, and output means for outputting the at least one revised subsystem performance parameter determined by said revising means to corresponding ones of said first plurality of control means.

2. The control assembly of claim 1, wherein each of said plurality of first control means comprises at least one process controller which receives subsystem performance data from said first sensing means and outputs a signal to said actuating means.

3. The control assembly of claim 1, further comprising a third control means communicating with said controls supervisor and for providing and controlling additional system performance setpoints.

4. The control assembly of claim 3, wherein said third control means comprises:

a sensor for sensing output image data;

comparing means for comparing the sensed output image data with the input image data and generating comparison data; and output means for outputting the comparison data to said controls supervisor;

wherein said controls supervisor further comprises adjusting means for adjusting the input image data based on the comparison data to correct for deviations between the output image and a desired output image.

5. The control assembly of claim 1, in combination with an image output terminal, the image output terminal having a marking engine for outputting an image and the marking engine comprising said plurality of printer subsystems which cooperate to produce a desired output image, wherein an image output by said image output terminal while operating in an uncontrolled state has an intrinsic tone reproduction curve.

6. The control assembly of claim 4, wherein the system performance setpoints are points on a tone reproduction curve corresponding to the input image and said first plurality of control means each inputs corresponding ones of the subsystem performance parameters output from said controls supervisor and controls the corresponding one of the plurality of printing subsystems to ensure that a tone reproduction curve of the output image matches the tone reproduction curve of the input image.

7. An image output terminal having a marking engine and an intrinsic tone reproduction curve, the image output terminal comprising:

a plurality of subsystems which cooperate to produce a desired output image; and a control assembly for controlling the plurality of subsystems, the control assembly comprising:

means for inputting image data representing an input image:

a first plurality of control means, each of the first plurality of control means controlling a corresponding one of the plurality of subsystems, and comprising, sensing means for sensing subsystem performance data of the corresponding printing subsystem, and controller means for generating and outputting a subsystem performance control signal based on a current subsystem performance parameter and the sensed subsystem performance data output by the sensing means so that the subsystem performance data corresponds to the subsystem performance parameter;

a second plurality of control means, each of the second plurality of control means controlling and adjusting an intermediate process output, and comprising,
sensing means for sensing intermediate process output data,
generating means for generating at least one recommended subsystem performance parameter for at least one corresponding control means of the first plurality of control means based on the intermediate process output data and an intermediate system performance setpoint, and
output means for outputting at least one of said at least one recommended subsystem performance parameters based on the intermediate process output data and the intermediate system performance setpoint; and a controls supervisor communicating with said first plurality of control means and said second plurality of control means and inputting at least one recommended subsystem performance parameter output from said second plurality of control means, said controls supervisor comprising,
revising means for revising at least one subsystem performance parameter based on the at least one recommended subsystem performance parameter output from the second plurality of control means to adjust the intermediate process output data to conform with the intermediate system performance setpoint, and
output means for outputting the at least one revised subsystem performance parameter to at least one of said first plurality of control means;
wherein said sensing means in the second plurality of control means generate system performance setpoints on the intrinsic tone reproduction curve and said controls supervisor outputs the at least one revised subsystem performance parameters to ensure that a tone reproduction curve of the image output matches a tone reproduction curve of the input image.

8. The image output terminal of claim 7, the control assembly further comprising a third control means communicating with said controls supervisor, the third control means providing additional system performance setpoints on the intrinsic tone reproduction curve of the image output terminal and controlling the means for inputting image data to ensure that the tone reproduction curve of the image output matches the tone reproduction curve of the input image.

9. The image output terminal of claim 8, wherein said third control means comprises, a sensor for sensing performance data corresponding to the additional system performance setpoints, comparing means for comparing the sensed performance data with corresponding system performance setpoints and generating a correction value, and output means for outputting the correction value to said means for inputting image data, wherein the means for inputting image data adjusts the input image data to insure that the tone reproduction curve of the image output matches the tone reproduction curve of the input image.

10. The image output terminal of claim 9, wherein said controls supervisor maintains a history of a performance of the first plurality of control means, said second plurality of control means and said third control means and uses the history, design knowledge and correlations between events to predict future failure of said image output terminal.

11. The image output terminal of claim 9, wherein said controls supervisor schedules actuations of said first plurality of control means, second plurality of control means and third control means so that the first plurality of control means, second plurality of control means and third control means cooperate to achieve a desired tone reproduction curve of the output image corresponding to a tone reproduction curve of an input image.

12. The image output terminal of claim 7, wherein said first plurality of first control means include at least two of a charging controller, an exposure controller, a toner concentration controller, a transfer controller, a fusing controller, a fuser stripping controller, and a cleaning field controller.

13. The image output terminal of claim 12, wherein said charging controller comprises an electrostatic voltmeter for sensing a level of charge on a photoreceptor, a converter for converting an output from the electrostatic voltmeter to a signal for actuating the scorotron to adjust the charge level of the photoreceptor to correspond to a charging performance parameter provided by said controls supervisor.

14. The image output terminal of claim 12, wherein said exposure controller comprises an electrostatic voltage detector for detecting an amount of charge left on a photoreceptor after exposure, a laser power control means for receiving the detected amount of charge left and adjusting an amount of laser power so the amount of charge left on the photoreceptor corresponds to an exposure performance parameter provided by said controls supervisor.

15. The image output terminal of claim 12, wherein said fusing controller comprises a temperature sensor on a fusing roll for sensing a temperature of the fusing roll, wherein a heating means is controlled by said fusing controller to maintain the temperature of the fusing roll in correspondence with a fusing performance parameter supplied by said controls supervisor.

16. The image output terminal of claim 12, wherein said development controller comprises a toner concentration sensor, and a toner concentration control means for receiving a signal from said toner concentration sensor indicative of an amount of toner in a developer housing, wherein a toner dispenser controlled by said toner concentration control means adjusts the amount of toner in the developer housing to correspond with a development performance parameter provided by said controls supervisor.

17. The image output terminal of claim 16, wherein said development controller further comprises a feedforward control means for receiving pixel data from a raster output scanner and controlling said toner dispenser to pre-dispense toner based on pixel data to ensure that the amount of toner in the developer housing corresponds to the development performance parameter.

18. The image output terminal of claim 7, wherein the means for inputting image data comprises,
a raster input scanner for inputting input image data,
an image processing system for receiving the input image data from said raster input scanner and preparing an image data flow,
a raster output scanner comprising a laser which receives the image data flow from said image processing system, and a process controls section having said control assembly located therein, wherein said process controls section communicates with said image processing system and said raster output scanner.

19. The image output terminal of claim 18, further comprising a charging station comprising a scorotron, a photoconductive member electrostatically charged by said scorotron, a developer housing for developing a latent image recorded by said raster output scanner on said photoconductive member, a toner dispenser for dispensing toner to said developer housing, a plurality of optical sensors for sensing a plurality of patch areas on said photoconductive belt, a fuser station comprising a fusing roll for fixing an image to a record medium, a record medium transport system for feeding the record medium to contact said photoconductive member to thereby transfer a latent image contained on said photoconductive member to the record medium and for feeding the record medium to said fuser station to fix the image on the record medium.

20. The image output terminal of claim 7, wherein said second plurality of control means comprises at least a solid area control means for controlling a solid area of a tone reproduction curve of the image output and a halftone area control means for controlling a halftone area of the tone reproduction curve of the image output, said solid area control means comprising a plurality of optical sensors for sensing the intermediate process output data corresponding to a solid area setpoint, wherein the intermediate process output data is a solid area developed mass to area ratio representing a ratio of a mass of toner developed on photoconductive member to an area of solid area density developed on the output image, and comparing means for comparing the sensed solid area developed mass to area ratio with the solid area setpoint and outputting the at least one subsystem performance parameter to said controls supervisor to ensure that the solid area developed mass to area ratio maintains its position on a desired tone reproduction curve of an output image;

said halftone area control means comprising a plurality of optical sensors to sense the intermediate process output data corresponding to said halftone area setpoint, wherein the intermediate process output data is a halftone developed mass to area ratio representing a ratio of a mass of toner developed on the photoconductive member to an area of halftone area density developed in the output image, and comparing means for comparing the sensed halftone area developed mass to area ratio with the halftone area setpoint and outputting the at least one subsystem performance parameter to said controls supervisor to ensure that the halftone area developed mass to area ratio maintains its position on the desired tone reproduction curve of the output image.

21. The image output terminal of claim 8, wherein said third control means comprises an image output correcting means having a density detecting device, wherein said density detecting device detects variations in highlight and shadow density of the output image tone reproduction curve and adjusts the input image data to insure that the highlight density and shadow density of the output image tone reproduction curve corresponds to the tone reproduction curve of the input image.

22. The image output terminal of claim 21, wherein said controls supervisor controls the image output correcting means to ensure that a tone reproduction curve of an image output corresponds to a tone reproduction curve of an input image.

23. The image output terminal of claim 7, wherein said generating means of said second plurality of control means generates a solid area setpoint by selecting a densest value from the image data input, and said generating means generates a halftone setpoint by assigning the halftone setpoint a value corresponding to a density of an input image data value which is less dense than the densest value.

24. The image output terminal of claim 7, wherein said controls supervisor performs a latitude trade-off function to prolong an operating life of the plurality of subsystems while maintaining system setpoints on the desired tone reproduction curve.

25. The image output terminal of claim 7, wherein said controls supervisor contains decision making tools including at least one of fuzzy logic, neural networks, sensor fusion, and genetic algorithms.

26. The image output terminal of claim 7, wherein each of said first plurality of control means comprises a normal operation control means for controlling subsystem performance while improving the stability and reducing noise of the subsystem performance when a subsystem performance parameter has not been changed and a rapid response control means for controlling the corresponding printing subsystem to provide rapid adjustment of the subsystem performance when a subsystem performance parameter is changed 27. The image output terminal of claim 7, wherein said controls supervisor further comprises warning means for recognizing errors in said first plurality of control means and generating a warning to inform an image output terminal operator of a system failure.

28. A method for controlling a printing system having a plurality of subsystems, a plurality of subsystem controllers and an image developing controller, comprising the steps of:

inputting data representative of an image;

generating system performance setpoints from the input image data;

generating subsystem performance parameters based on said system performance setpoints, each subsystem performance parameter corresponding to one of the plurality of subsystems;

controlling a performance of each of the plurality of subsystems by sensing subsystem performance data and adjusting subsystem performance based on the sensed performance data and the corresponding subsystem performance parameter;

sensing system setpoint performance; and adjusting the subsystem performance parameters during printing operation to produce a desired output image.

29. The method of claim 28, wherein the printing system is an image output terminal and the system performance setpoints are points on a tone reproduction curve corresponding to a tone reproduction curve of the input image, wherein the method further comprises the steps of:

generating at least a solid area setpoint and a halftone area setpoint corresponding to an output image having an intrinsic tone reproduction curve output by the image output terminal operating in an uncontrolled state;

sensing a performance of the image output terminal corresponding to the solid area setpoint and the halftone area setpoint; and controlling the performance of the image output terminal to ensure that the solid area setpoint and the halftone area setpoint of the tone reproduction curve of the output image match corresponding solid area and halftone area setpoints on a tone reproduction curve of an input image.

30. The method of controlling a system of claim 29, further comprising the steps of:

generating additional setpoints corresponding to highlight and shadow density regions on the tone reproduction curve of the input image;

sensing variations between highlight and shadow density regions in the tone reproduction curve of the output image and the corresponding additional setpoints of the tone reproduction curve of the input image;

adjusting the input image data to ensure that setpoints corresponding to the highlight and shadow density regions of the output image tone reproduction curve correspond to the additional setpoints of the input image.

31. The method of controlling a printing system of claim 28, wherein the step of controlling performance of each of the plurality of subsystems comprises the steps of:

sensing a subsystem condition;

comparing the sensed subsystem condition with a subsystem performance setpoint; and adjusting operation of the subsystem to maintain the performance setpoint.

32. The method of controlling a system of claim 29, wherein the step of controlling performance of the image input terminal comprises the steps of:

sensing intermediate variations during a printing operation in a solid area developed-mass-to-area ratio representing a ratio of a mass of toner developed to an area of solid density developed on the output image; and adjusting a subsystem performance parameter to control the solid area developed-mass-to-area ratio to maintain a desired solid area density of the tone reproduction curve of the output image, wherein said step of adjusting the subsystem performance parameter includes adjusting a voltage applied to a photoconductor of the image output terminal.

33. The method of controlling a printing system of claim 29, wherein the step of controlling performance of the image output terminal comprises the steps of:

sensing intermediate variations during a printing operation in percent dot coverage in a halftone area representing the amount of area covered by developed toner in a halftone region on the output image; and adjusting at least one subsystem performance parameter to control the percent dot coverage to maintain a desired halftone area density of the tone reproduction curve of the output image, wherein the step of adjusting the subsystem performance parameter includes adjusting a power level of a laser beam of the image output terminal.

34. The method of controlling a system of claim 28, further comprising the steps of:

maintaining a performance history of the plurality of subsystem controllers and the image developing controller;

diagnosing potential future failures of the plurality of subsystem controllers and image developing controller based on the performance history; and performing a trade-off function by adjusting subsystem controllers and the image developing controller to prolong an operating life of the subsystems while maintaining the system performance setpoints.

35. The method of controlling a system of claim 28, further comprising the step of scheduling operation of the subsystem controllers so that the subsystem controllers cooperate to achieve a desired tone reproduction curve in the output image and to prevent conflicts between the subsystems.

* * * * *